April 11, 1961 E. M. PIERCE 2,979,213
ROTARY FEEDER FOR REFUSE AND THE LIKE
Original Filed Nov. 13, 1957 5 Sheets-Sheet 1
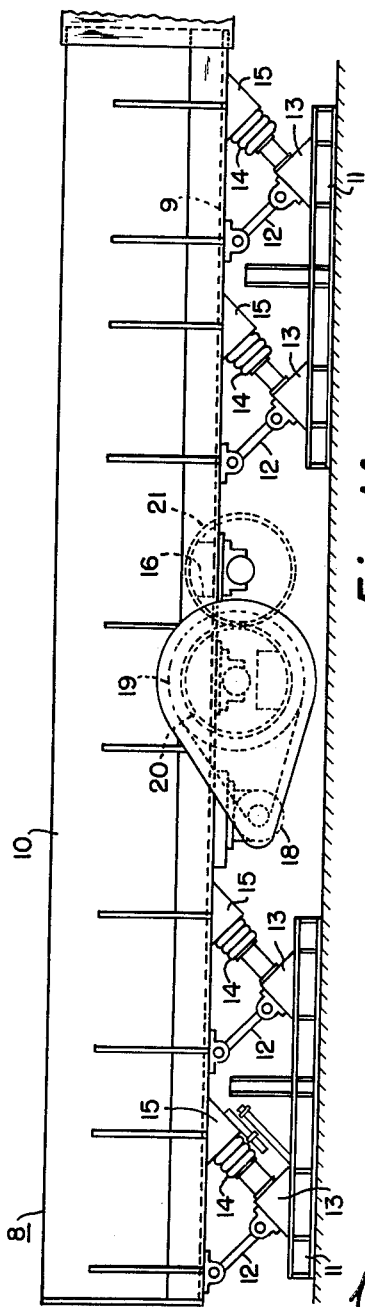
Fig. IA
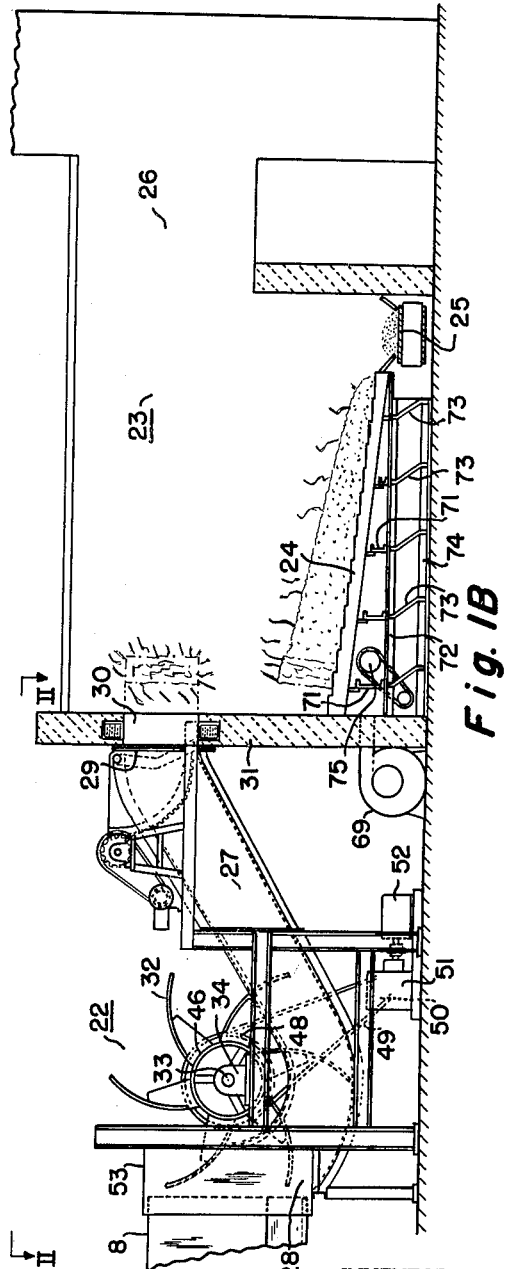
Fig. IB
INVENTOR.
Edgar M. Pierce
BY Webb, Mackey & Burden
HIS ATTORNEYS April 11, 1961 E. M. PIERCE 2,979,213
ROTARY FEEDER FOR REFUSE AND THE LIKE
Original Filed Nov. 13, 1957 5 Sheets-Sheet 2

INVENTOR.
Edgar M. Pierce
BY
Webb, Mackey & Burden
HIS ATTORNEYS

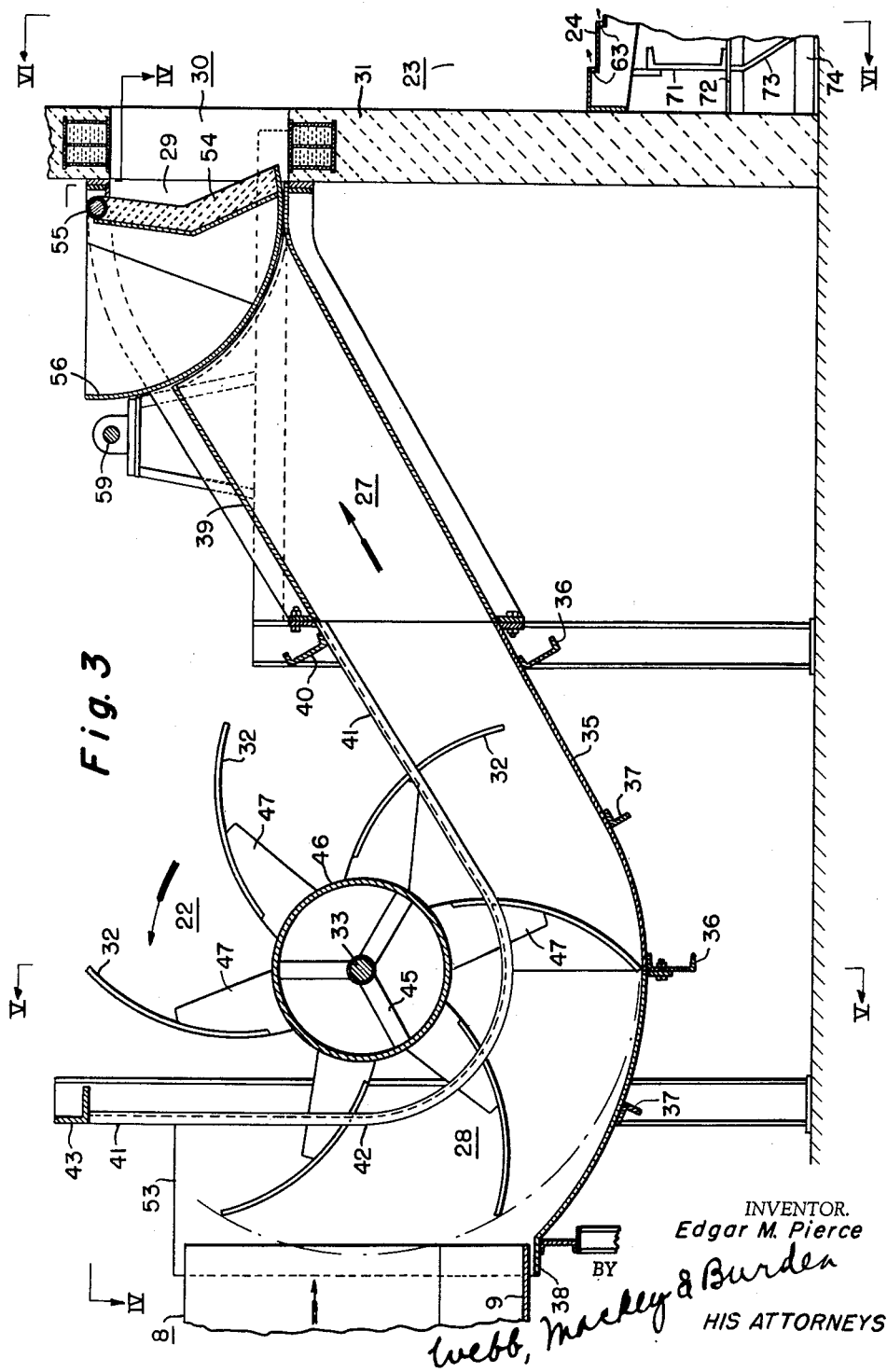

April 11, 1961 E. M. PIERCE 2,979,213
ROTARY FEEDER FOR REFUSE AND THE LIKE
Original Filed Nov. 13, 1957 5 Sheets-Sheet 4

INVENTOR.
Edgar M. Pierce
BY Webb, Mackey & Burden
HIS ATTORNEYS

April 11, 1961 E. M. PIERCE 2,979,213
ROTARY FEEDER FOR REFUSE AND THE LIKE
Original Filed Nov. 13, 1957 5 Sheets-Sheet 5

INVENTOR.
Edgar M. Pierce
BY
Webb, Mackey & Burden
HIS ATTORNEYS

United States Patent Office 2,979,213
Patented Apr. 11, 1961

2,979,213

ROTARY FEEDER FOR REFUSE AND THE LIKE

Edgar M. Pierce, Starlight Drive, Morristown, N.J.

Original application Nov. 13, 1957, Ser. No. 696,166. Divided and this application Mar. 31, 1959, Ser. No. 806,736

13 Claims. (Cl. 214—18)

This application relates to method and apparatus for the continuous combustion of refuse and the like. More particularly, it relates to a rotary feeder used in conjunction with such apparatus, the purposes being primarily for the disposal of municipal and industrial refuse. Such refuse may include discarded paper, cardboard, wood, rags, plastic containers, garbage, sewage sludge, and other combustible material. Noncombustible materials are also present, such as bottles, metal containers, etc. In accordance with my inventions, such refuse is burned continuously in a furnace. Ash from the furnace is disposed of in a conventional way and the gaseous products of combustion are passed through water scrubbers for removal of fly ash and other impurities before they pass into the atmosphere.

The present application, forming a division of my co-pending case, parent application Serial No. 696,166 relating to the overall apparatus and filed November 13, 1957, is particularly addressed to the feeder mechanism employed in that apparatus.

A semi-continuous disposal of industrial and municipal refuse has heretofore been proposed. The apparatus and processes used, however, have not been satisfactory because of certain problems inherent in the disposal of refuse. One difficulty has been that trucks bringing refuse to the incinerator all deliver their loads within a period of an hour twice daily, once in the morning and once in the afternoon. Obviously, all of the refuse cannot be burned as it is delivered and some arrangement must be made for storage of the refuse before it is burned during the time intervals between delivery of the refuse. Also, the refuse must be continuously fed to a furnace and in a rather loose condition so that a relatively large proportion of the surface of the refuse will be exposed for burning. At the same time that the refuse is continuously fed to the furnace, there must be some provision for sealing the furnace so that the proportion of refuse and air in the furnace can be closely controlled. Added to these difficulties is the nature of the refuse itself, in that it can include a wide variety of materials in a variety of sizes and shapes, varying from soft garbage to tin cans, bottles, logs, bulky paper boxes, old newspapers, etc.

The rotary feeder and attendant apparatus which comprise my inventions solve these problems of refuse disposal, as will now be explained. The feeder itself is primarily adapted for the continuous handling of refuse of the municipal and industrial variety above indicated. More broadly, however, it is equally well adapted for continuously feeding refuse and matter of other varieties and irrespective of whether they are ultimately burned or burnable.

In the accompanying drawings, I have illustrated certain presently preferred embodiments of my inventions, in which:

Figures 1A and 1B comprise a side view (partially in section) of my apparatus;

Figure 3 is a vertical section along the lines III—III of Figure 2;

Figure 2:
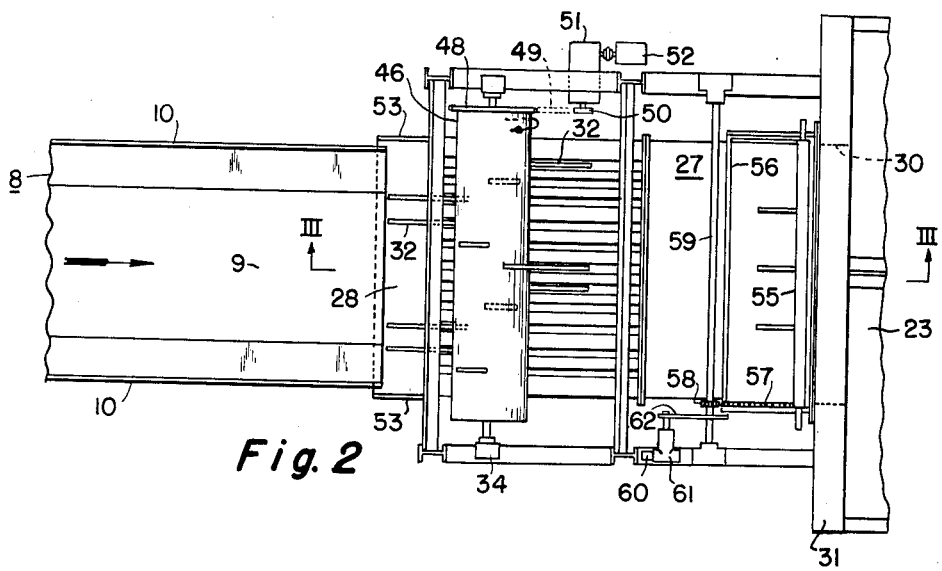
Figure 2 is a partial plan view of Figure 1B along the lines II—II of Figure 1B.

Referring to Figures 1A and 1B, my apparatus comprises a long vibrating conveyor 8 which, as shown in Figures 1A and 2, is in the form of an elongated hopper having a bottom 9 and sides 10. The hopper is mounted on bases 11 which in turn support links 12 which are pivotally connected to pedestals 13 on the bases and to the bottom 9 adjacent its sides. The pedestals 13 also support pneumatic springs 14 which press against seats 15 also secured to the bottom 9 of the conveyor. The conveyor is vibrated longitudinally by a conventional off-center weight 16 driven by a motor 18 through a chain sprocket drive 19 and gearing 20 and 21. Such a conveyor is conventional and, as is well known, when the conveyor is longitudinally vibrated by the off-center weight 16, material deposited at one end of the conveyor (in this case, the left-hand end, viewing Figure 1A) will be moved along the conveyor towards the other end of the conveyor.

In accordance with my invention, the size of the conveyor is determined by the quantity of refuse which is delivered to an incinerator embodying my apparatus. As material is dumped from the trucks at one end, it is moved across the conveyor over to a feeder, which will later be described. Refuse can be dumped at any time at one end of the conveyor and it will be moved across the conveyor so as to continuously supply refuse to the feeder. At the same time, the conveyor will have sufficient capacity to store all of the refuse received by an incinerator before it is passed to the feeder and by the feeder into a furnace for consumption.

Referring to Figure 1B, refuse is delivered from the right-hand end (viewing Figures 1A and 1B) of the conveyor to a feeder, designated generally by the reference number 22. The feeder then passes the refuse into a furnace, designated generally by the reference number 23, where it is burned on a pulsating grate 24 which continuously moves the refuse along its length while the refuse is burned. The resulting ashes are delivered from the end of the grate 24 onto a conveyor 25 which delivers them to trucks or to storage. Gaseous products of combustion pass out through a flue 26 to a gas scrubber where they are cleaned before passing to atmosphere. The gas scrubber used is conventional and, therefore, is not shown or described.

Figure 4:
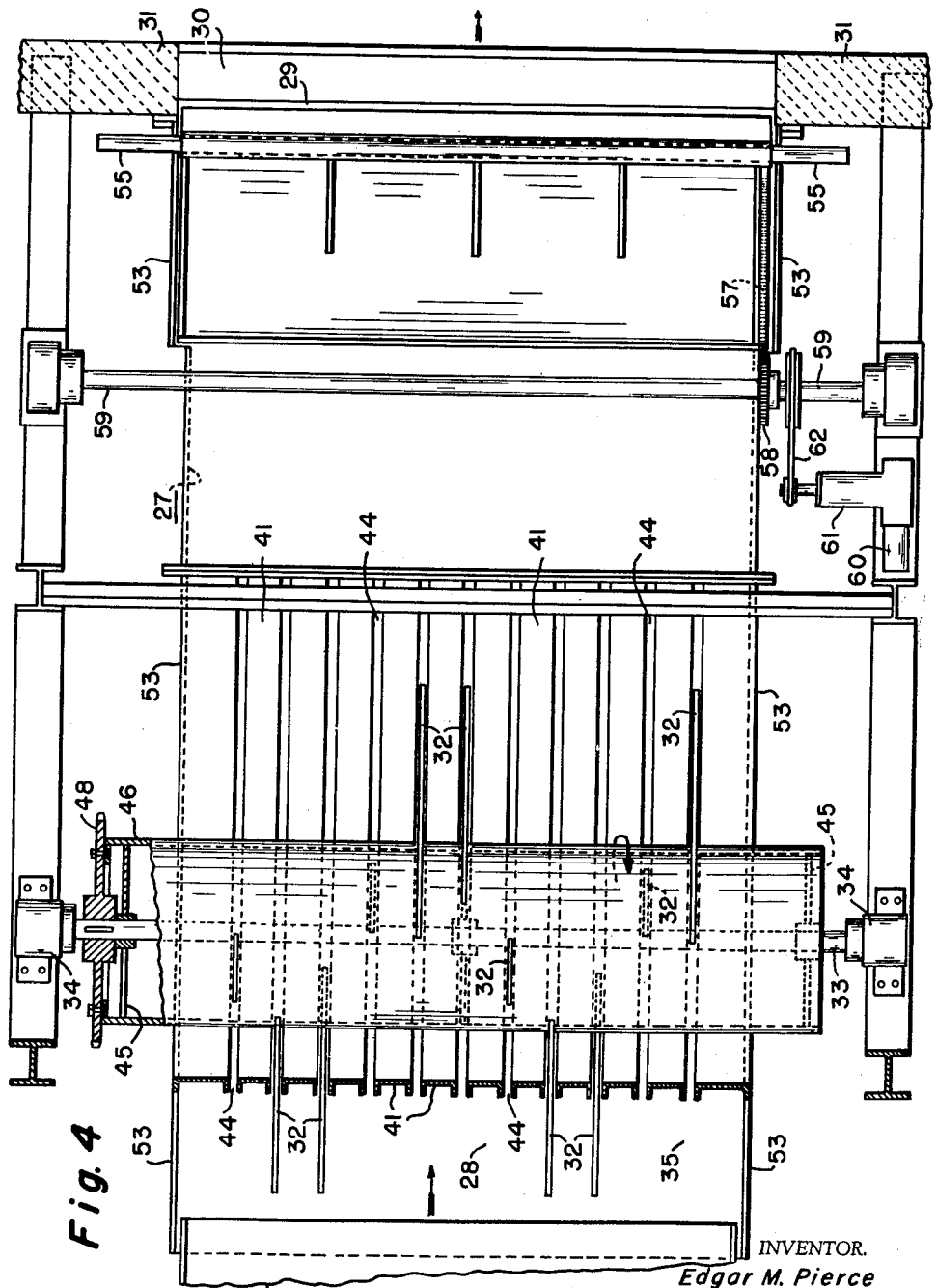
Figure 4 is a view similar to Figure 2 but on an enlarged scale.

Figures 3 and 4 show the feeder for delivering refuse from the conveyor to the furnace. The feeder comprises an elongated passageway, designated generally by the reference number 27, having a refuse receiving opening 28 adjacent the delivery end of the conveyor 8 and a refuse discharging opening 29 which leads to an opening 30 in an end wall 31 of the furnace 23.

The feeder also has mechanism for pushing refuse received from the conveyor 8 at the opening 28 through the passageway 27 and out the discharge opening 29, through the opening 30 in the furnace wall, and thence onto the grate 24. This mechanism comprises a plurality of arms 32 which, as shown in Figure 3, extend outwardly from a horizontally extending shaft 33 which extends from side to side across and above the passageway 27 and is journaled outside the passageway in suitably supported bearings 34. The shaft is rotated by mechanism hereinafter described so that the arms 32 turn with the shaft and engage refuse in the receiving opening 28 and force it through the passageway 27.

The passageway 27 is formed by a casing having a bottom wall 35 of metal plates suitably supported and reinforced by channels 36 and angles 37. Referring to Figure 3, it will be seen that the bottom wall 35 extends in substantially a straight line from the bottom of the discharge opening 29 to a point approximately beneath the shaft 33, whereupon it curves upwardly and terminates at the point 38 beneath the end of the bottom 9 of the conveyor.

The top of the casing is also formed for a portion of its length extending from the furnace of metal plate 39 which is suitably supported by a channel 40 and the furnace wall 31. As shown in Figure 3, the plate 30 curves slightly at its end next to the furnace wall 31 and is secured to the furnace wall 31 at the top of the opening 30. The plate 39 terminates at the channel 40 which, as appears from Figure 3, is at a point on the furnace side of the shaft 33 just beyond the outermost reach of the arms 32 as they rotate with the shaft 33.

The balance of the top of the casing for the passageway 27 is formed of a series of U-shaped channels 41 which, as shown in Figure 3, extend from the channel 40 in a straight line for a portion of their length and are then curved upwardly around the shaft 33, but spaced therefrom, until they reach a point 42 at approximately the same elevation as the shaft 33, whereupon they are again straight and extend vertically to a supporting angle 43 which is beyond the reach of the arms 32. The curved portions of the channels 41 between the shaft 33 and the end 38 of the bottom of the casing form the refuse receiving opening 28. The remaining portions of the channels 41 which extend upwardly between the shaft 33 and the conveyor 8 form a wall or barrier so that refuse delivered by the conveyor 8 will fall into the opening 28.

As is shown in Figure 4, the channels 41 are spaced from each other across the passageway 27 so as to form slots 44 through which the arms 32 extend and through which the arms may pass as they rotate on the shaft 33.

Also, as shown in Figure 4, the channels 41 are U-shaped and are secured to the channels 40 and 43 so that their flanges extend toward the interior of the passageway 27, thus providing rails along which the garbage may move through and up the passageway 27.

Figure 5:
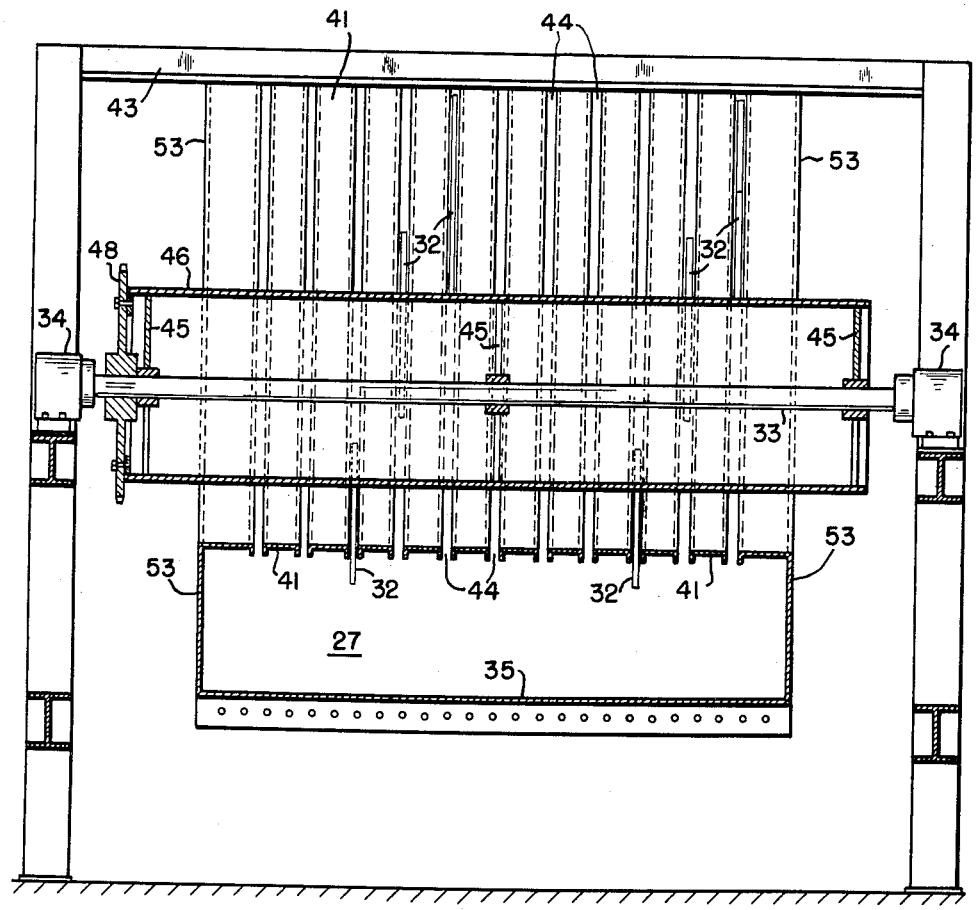
Figure 5 is a vertical section along the lines V—V of Figure 3.

The mounting and operation of the arms 32 will now be described with particular reference to Figures 3, 4, and 5. Spiders 45 mounted at each end and in the center of the shaft 33 support on the shaft a cylindrical drum 46 which rotates with the shaft 33. The arms 32 are secured to web plates 47 and these plates are welded to the periphery of the drum 46. Referring to Figures 3 and 4, it will be seen that the arms 32 are spaced from each other along the shaft 33 so that they are in line with the slots 44 and can pass through the slots upon rotation of the shaft 33. From Figure 4, it will also be noted that the arms 32 are spaced angularly from each other about the drum 33 so that they do not all pass through the refuse delivered by the conveyor 8 at the same time. This arrangement of the arms has several advantages. It provides space through which large solid objects which may be in the refuse can pass into the opening 28. At the same time, however, the arms push all of the refuse from the conveyor into and through the passageway 27. Also, if the solid object has appreciable length, it will be struck repeatedly in different places by successive arms and thereby lined up for movement through the passageway 27.

One end of the drum 46 carries a sprocket wheel 48 which is also keyed to the shaft 33 (see Figure 5) and the sprocket wheel 48 carries a chain 49 passing around a gear 50 on a gear reducer 51 driven by a motor 52. The motor 52 thereby turns the shaft 33 and drum 46 and causes the arms 32 to rotate in the direction of the arrows shown in Figures 1B and 3.

Preferably, the arms 32 have the shape of an involute curve, as shown in Figure 3, so that, as they pass through the slots 44 between the channels 41 to the rear (in the direction of refuse movement) of the axle 33, there is a wiping action between the flanges of the channels and the arms 32, which thereby cleans the blades of refuse. Preferably also, the arms 32 are made of spring steel so that, if they strike any obstruction in the refuse, they will deflect and pass over the obstruction rather than create excessive pressure against the casing. Instead of being made of resilient spring steel, the arms may be pivotally mounted on the drum 46 and held in position by springs.

Again referring to Figure 3, it will be seen that the arms 32 pass through the vertical wall formed by the channels 41 in advance of the axle 33 and then pass downwardly through refuse delivered by the conveyor 8 and through the refuse receiving opening 28. At this point, the arms extend substantially across the opening 28. Upon further rotation, the arms pass close to (but do not touch) the bottom plate 35 at a point beneath the axle 33 and thus extend substantially across the passageway 27.

The passageway 27 is completed by side plates 53 which form the sides of the casing defining the passageway 27. As shown in Figure 3, the side plates 53 overlap the sides of the conveyor so as to insure delivery of all refuse into the opening 28. At the discharge opening 29, a refractory-faced gate 54 is provided to close the passageway 27 when desired. The gate 54 is secured at its top to a shaft 55 which rests in bearings outside the side plates 53. A curved plate 56 extends from the bottom of the gate 54 to a point approximately level with the shaft 55 and prevents refuse from being forced up against the gate 54 when it is closed so that the gate can be readily opened without forcing refuse back through the passageway 27. The plate 56 carries a rack 57 which meshes with a pinion 58 carried on a second shaft 59. The shaft 59 and the pinion are driven by a motor 60, gear reducer 61, and chain drive 62. The motor 60 can therefore be energized to open and close the gate 54.

Referring to Figure 1B, it will be seen that refuse fed through the passageway 27 passes out the refuse discharging opening 29 into the furnace 23. From there, it falls onto a pulsating grate 24. As illustrated in Figure 1B, the refuse will extend outwardly from the opening 30 before it falls onto the grate 24. At that point, it is ignited so that, when it falls down upon the grate 24, it will already have been ignited and the ignited surfaces fall face down upon the grate 24, thus improving combustion on the grate.

The grate 24 is a stepped grate sloping downwardly from the end which receives the refuse to the end which delivers the ashes. There is an air opening 63 in each riser of the stepped grate so that air can be blown from beneath the grate out through the openings in the risers and into the refuse which is burning on the grate.

Figure 6:
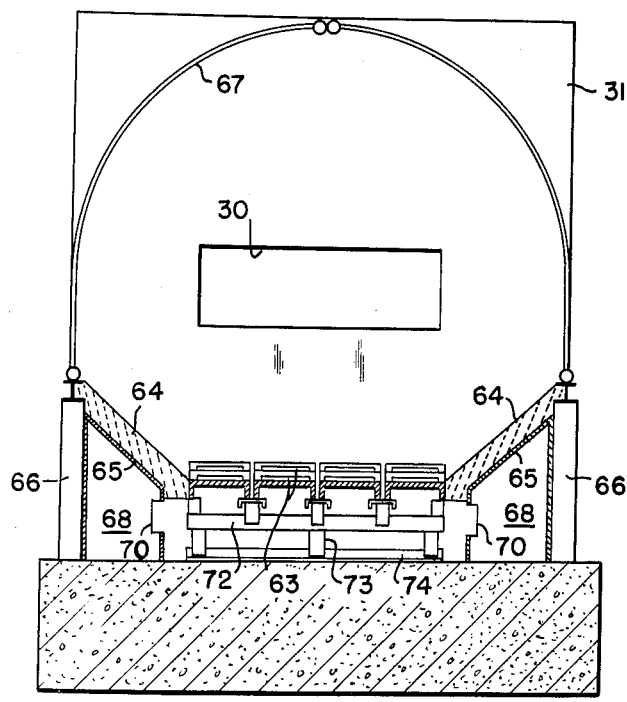
Figure 6 is a section along the lines VI—VI of Figure 3.

Referring to Figure 6, it will be seen that the grate is enclosed on each side by refractory walls 64 supported by steel plates 65 which extend vertically upwardly above the sides of the grate and then extend vertically and outwardly to the side walls of the furnace. Outer walls 66 which support the roof 67 of the furnace form with the walls 64 plenum chambers 68 into which air can be blown by a blower 69 (see Figure 1B). The air then passes through dampers 70 in the walls 64 beneath the grate and out through the openings 63.

The grate 24 is supported in a frame of cross beams 71 and longitudinal beams 72. The frame, in turn, is supported on a series of leaf springs 73 anchored at their lower ends to a base 74. A conventional vibrating mechanism 75 is mounted on the frame and causes the frame and grate to vibrate longitudinally on the springs.

The furnace is also supplied with air above the refuse on the grate by a blower, not shown. This air, plus the air supplied from beneath the refuse through the risers on the stepped grate, provides substantially complete combustion of the refuse. While the refuse is burning on the grate, vibration of the grate causes it to move along the grate continuously so that burning refuse is received at one end and ashes are discharged at the other end.

The operation of my method and apparatus for continuously burning refuse is as follows. Refuse is deposited at one end of the conveyor 8. It is continuously moved across the conveyor to the feeder 22. The conveyor has sufficient size so that a large quantity of refuse can be dumped on it in a short period of time and the conveyor can store the refuse while moving it towards the feeder so that refuse will be continuously supplied to the feeder. Heretofore, the refuse has been received in storage pits and moved to the furnace in batches by a hoist and bucket.

The feeder receives the refuse in the refuse receiving opening 28. Rotation of the arms 32 advances the refuse through the opening 28 and through the passageway 27 to the discharge opening 30. The arms strike the refuse delivered by the conveyor 8 in succession and thereby continuously move refuse through the opening 28 and the passageway 27. While in Figure 3 I have shown the arms 32 as preferably extending the full depth of the passageway 27 in a portion of their path of travel, I have found that it is necessary only that the arms extend a substantial distance into the passageway even though some of the refuse may be of extremely small size. That is to say, there may be a clearance of several inches between the ends of the arms and the bottom 35 of the casing. Refuse of larger size which is engaged by the arms will push before it through the passageway the small-sized refuse and wipe the sides of the passageway clean. They also fill up the passageway 27 with refuse so that the opening 30 is sealed and the correct proportion of fuel and air may be maintained in the furnace. At the same time, the refuse is not compacted to such an extent that it will be difficult to burn when it reaches the furnace. From the passageway 27 and the discharge opening 30, the refuse falls onto the grate 24. It is, however, ignited before it strikes the grate, thus improving combustion. As has heretofore been described, the grate continuously moves refuse while burning along its length. Since it is pulsating, it continuously agitates the fuel bed and accelerates combustion.

While I have described certain presently preferred embodiments of my invention, it is to be understood that they may be otherwise variously embodied within the scope of the appended claims.

I claim:

1. Apparatus for continuously feeding refuse and the like, said feeder comprising an enclosed, upwardly inclined passageway having a lower opening through which the refuse is fed into the passageway, and means for advancing the refuse through said passageway, said means comprising a plurality of arms extending outwardly from a common axis positioned adjacent said opening and being spaced from each other along said axis and across the passageway, said arms being backwardly curved in the rotational sense and of sufficient length to extend substantially across said opening and means for forwardly rotating the arms about said common axis whereby said arms upon rotation in the forward sense push refuse in front of said opening into said opening and through and up the passageway.

2. Apparatus as described in claim 1 and having a vertical wall positioned adjacent said opening, said wall extending the width of the opening and above it and having vertical slots therein spaced from each other across the wall and in line with said arms whereby said arms pass through the slots upon rotation about their common axis.

3. Apparatus as described in claim 1, in which said common axis is positioned above the passageway and adjacent said opening and in which the top surface of said passageway has slots extending parallel to each other and to the central axis of the passageway, said arms each passing through, along and out of said slots as they rotate about said common axis.

4. Apparatus as described in claim 1, in which said passageway has an upper discharge opening at its end removed from the receiving opening and a door for closing said discharge opening and having a curved deflector plate secured to and in advance of said door (in the direction of refuse flow) to fend off refuse from jamming said door closed.

5. A feeder for moving refuse or the like comprising a casing forming a passageway having a refuse receiving opening at one end and a refuse discharging opening at its other end, a shaft outside the casing adjacent the receiving opening and extending across the passageway from side to side and being journaled for rotation, a portion of said passageway adjacent said shaft being curved around but spaced from said shaft, the wall of the casing forming said curved portion which faces the shaft having longitudinally extending slots therein, bars spaced along said shaft and extending outwardly therefrom, said bars being spaced so as to pass through said slots and having sufficient length to extend substantially across the interior of said passageway and substantially all of said receiving opening and means to rotate said shaft about its axis whereby said bars rotate about the axis of the shaft, pick up refuse in advance of said receiving opening, and move it through said passageway and out said discharge opening.

6. A feeder as described in claim 5, in which the slotted wall of said passageway extends vertically above and in advance of said axle (in the direction of refuse flow) forming a stop for refuse supplied to the feeder.

7. A feeder as described in claim 5, in which the bars which extend from said shaft are curved longitudinally in involute curves.

8. A feeder as described in claim 5, in which the bars which extend from said shaft are resilient whereby they may pass over obstructions in their paths of travel.

9. A feeder as described in claim 5, in which the bars which extend from said shaft are resiliently mounted on said shaft whereby they may pass over obstructions in their paths of travel.

10. A feeder as described in claim 5, in which said bars are spaced angularly from each other about the circumference of said shaft.

11. A feeder for moving refuse or the like comprising a generally rectangular shaped casing forming a passageway having a refuse receiving opening at one end and a refuse discharging opening at its other end, a shaft outside the casing adjacent the receiving opening and extending across the top of the casing and being journaled for rotation, a portion of said casing adjacent said shaft being curved around but spaced from said shaft and terminating in said receiving opening, the top wall of said casing having longitudinally extending slots spaced from each other across its width, resilient, involutely curved bars spaced along said shaft and angularly with respect to each other about said shaft and extending outwardly from said shaft, said bars having sufficient length to extend substantially across said opening and the passageway along a portion of its length, and means to rotate said shaft about its axis whereby said bars as they rotate pass from above said opening, substantially across said opening, across the passageway and then out of said passageway through said slots thereby moving refuse positioned in and around said receiving opening through said opening and said passageway and out said discharging opening.

12. A feed according to claim 5, wherein the shaft-facing portion of the casing as aforesaid is of fabricated construction comprising a series of parallel U-channels defining said longitudinally extending slots therebetween.

13. A feeder according to claim 12, wherein the flanges of said series of said channels provide inwardly facing rails along which the rotating bars extending from said shaft move the refuse through and up the passageway, said flanges disposed operatively alongside the paths of rotation of said individual bars and establishing a wiping motion of cooperation therewith effective to produce a self-cleaning action.

References Cited in the file of this patent

UNITED STATES PATENTS

| | | |
|---|---|---|
| 1,225,802 | Greenawalt | May 15, 1917 |
| 2,879,904 | Walsh | Mar. 31, 1959 |